Oct. 13, 1931.  I. C. KLINGLER  1,826,793
SELF CLEARING RAKE
Filed Nov. 3, 1928

INVENTOR
Ira C. Klingler
BY Chappell & Earl
ATTORNEYS

Patented Oct. 13, 1931

1,826,793

UNITED STATES PATENT OFFICE

IRA C. KLINGLER, OF ELKHART, INDIANA

SELF CLEARING RAKE

Application filed November 3, 1928. Serial No. 316,927.

The main object of this invention is to provide a self clearing rake in which the clearing or stripper portion may be applied to rakes of the type now very widely used without change or modification in the structure thereof.

A further object is to provide a structure having these advantages which is strong and durable and at the same time very economical.

Objects pertaining to details and economies of my invention will definitely appear from the description to follow. The invention is defined in the claim.

A structure which embodies the features of my invention is clearly illustrated in the accompanying drawings, in which:

Fig. 3 is a section on line 3—3 of Fig. 2.

Figure 1:
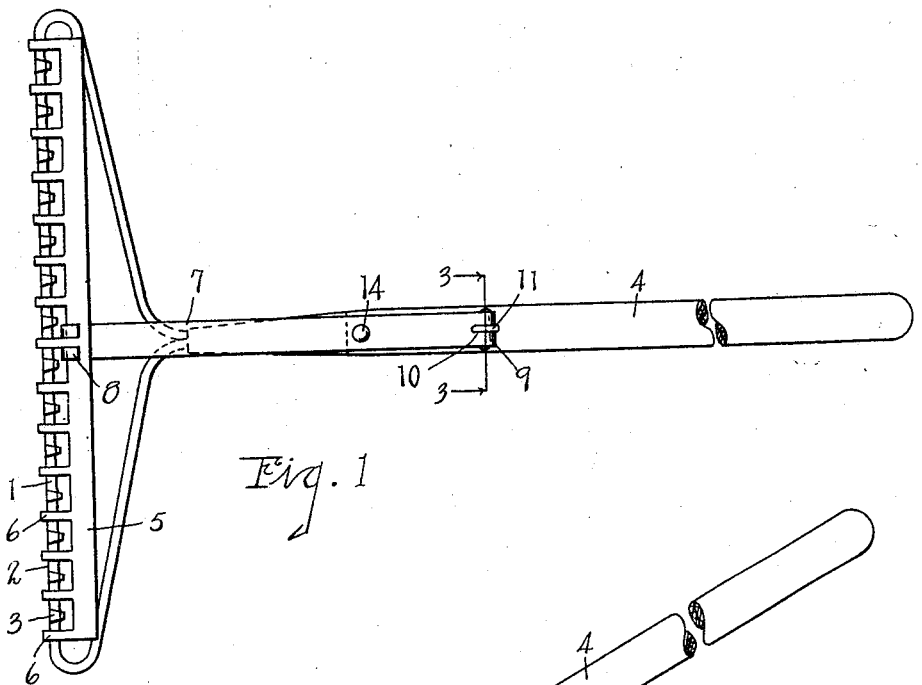
Fig. 1 is an inverted view of a rake embodying the features of my invention, the handle being partially broken away.

Referring to the drawings, the rake head 1 is of the well-known type in which the metal bar 2 is provided with a plurality of teeth 3. The handle 4 is of wood.

I provide a stripper bar 5 having spaced teeth 6 disposed to project forwardly between the teeth of the rake. The stripper bar is provided with a shank 7 secured to the stripper bar centrally thereof, the end of the shank being folded around the stripper bar at 8 and welded thereto.

At its outer end the shank is provided with an upturned knuckle 9 having a longitudinal slot 10 therein to receive the eye 11 of the screw-eye 12 which is threaded into the shank in proper position. A pintle or pivot 13 is arranged through the knuckle.

Figure 2:
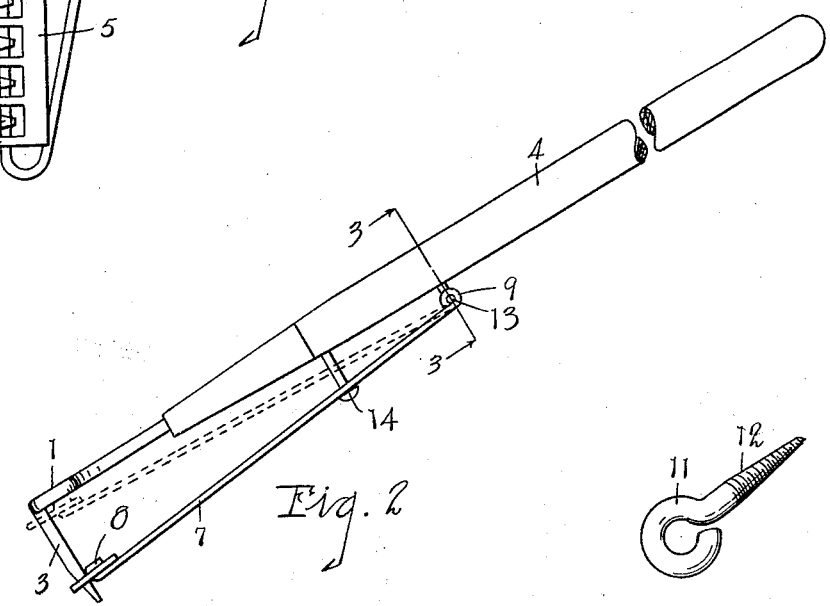
Fig. 2 is a fragmentary side elevation, the stripper being shown in its lowered position by full lines and in its raised position by dotted lines.
Figure 4:
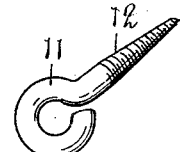
Fig. 4 is a perspective view of a screw-eye employed as a support for the stripper pivot.
Figure 5:
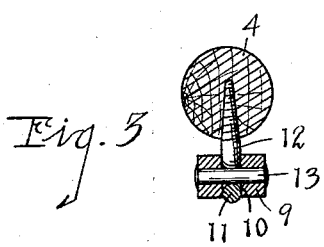

The shank has a hole therein spaced from the pivot to receive the headed stud 14 which is preferably a nail or screw driven into the handle, the head limiting the outward swing of the shank as shown in Fig. 2.

With the parts thus formed and arranged they are very economical to produce and assemble and the stripper parts may be furnished as an attachment to be applied by the user to rakes of standard types now in use. The stripper acts by gravity to remove ordinary accumulations but should the rake become clogged so that gravity is not sufficient the stripper may be actuated by engaging the ends of its teeth with the ground.

Having thus described my invention what I claim as new and desire to secure by Letters Patent is:

The combination with a rake head provided with a handle, of a stripper bar provided with forwardly spaced teeth disposed between the teeth of the rake, a centrally disposed shank for said stripper bar having an upturned knuckle at its outer end, said shank having a hole therein spaced from its said knuckle, a screw-eye threaded into said handle, the end of said shank being slotted to receive said screw-eye, a pintle engaging said knuckle and screw-eye, and a headed stud arranged through said hole in said shank and driven into said handle constituting a stop limiting the outward swing of the stripper said stripper being freely movable on its pivot.

In witness whereof I have hereunto set my hand.

IRA C. KLINGLER.